United States Patent
Beaudet et al.

(10) Patent No.: US 6,726,353 B1
(45) Date of Patent: Apr. 27, 2004

(54) ELECTRIC HAND OPERATED ROTARY BEATER/MIXER COMPRISING A SAFETY DEVICE

(75) Inventors: Jean-Yves Beaudet, Haleine (FR); Marc Marriere, Ambrieres les Vallees (FR)

(73) Assignee: SEB S.A., Ecully Cedex (FR)

( * ) Notice: Subject to any disclaimer, the term of this patent is extended or adjusted under 35 U.S.C. 154(b) by 50 days.

(21) Appl. No.: 10/009,977

(22) PCT Filed: Jun. 16, 2000

(86) PCT No.: PCT/FR00/01682

§ 371 (c)(1),
(2), (4) Date: May 8, 2002

(87) PCT Pub. No.: WO00/78195

PCT Pub. Date: Dec. 28, 2000

(30) Foreign Application Priority Data

Jun. 17, 1999 (FR) .............................. 99 07808

(51) Int. Cl.$^7$ ................................................ A47J 43/07
(52) U.S. Cl. ..................................................... 366/129
(58) Field of Search ......................... 366/129–130, 366/142, 197, 199, 206, 342–344, 601; 310/50

(56) References Cited

U.S. PATENT DOCUMENTS

| 2,685,435 | A | * | 8/1954 | Moore | 366/200 |
|---|---|---|---|---|---|
| 3,328,001 | A | * | 6/1967 | Zasadny | 366/129 |
| 3,595,093 | A | * | 7/1971 | Du Bois et al. | 366/129 |
| 3,604,114 | A | * | 9/1971 | Swanke et al. | |
| 3,619,754 | A | | 11/1971 | Fuchs | |
| 3,821,902 | A | * | 7/1974 | Du Bois et al. | 366/129 |
| 5,316,382 | A | * | 5/1994 | Penaranda et al. | 366/129 |
| 5,803,598 | A | * | 9/1998 | Harry et al. | 366/129 |
| 5,871,278 | A | | 2/1999 | Harry et al. | |
| 5,875,706 | A | | 3/1999 | Borger | |
| 6,234,663 | B1 | * | 5/2001 | Lecerf et al. | 366/129 |
| 6,572,254 | B1 | * | 6/2003 | Marriere et al. | 366/129 |
| 6,637,925 | B1 | * | 10/2003 | Beaudet et al. | 366/129 |

FOREIGN PATENT DOCUMENTS

DE  3942712  * 6/1991

* cited by examiner

*Primary Examiner*—Charles E. Cooley
(74) *Attorney, Agent, or Firm*—Young & Thompson

(57) ABSTRACT

Handheld electric beater-mixer includes a body (2) containing an electric drive motor (6), two rotary coupling devices (20, 33) which are connected to the shaft (8) of the motor and which are adapted to receive, via respectively two engagement passages (26, 43) opening from the body (2), a whisk (10) and, respectively, a mixer foot (45), and a safety device (55) adapted to prevent the simultaneous emplacement of the whisk and of the mixer foot. The safety device (55) includes a movable mechanical member (57) adapted to block selectively one or the other of the two passages (26, 43) for engagement of the whisk (10) and of the mixer foot (45).

9 Claims, 3 Drawing Sheets

FIG_1
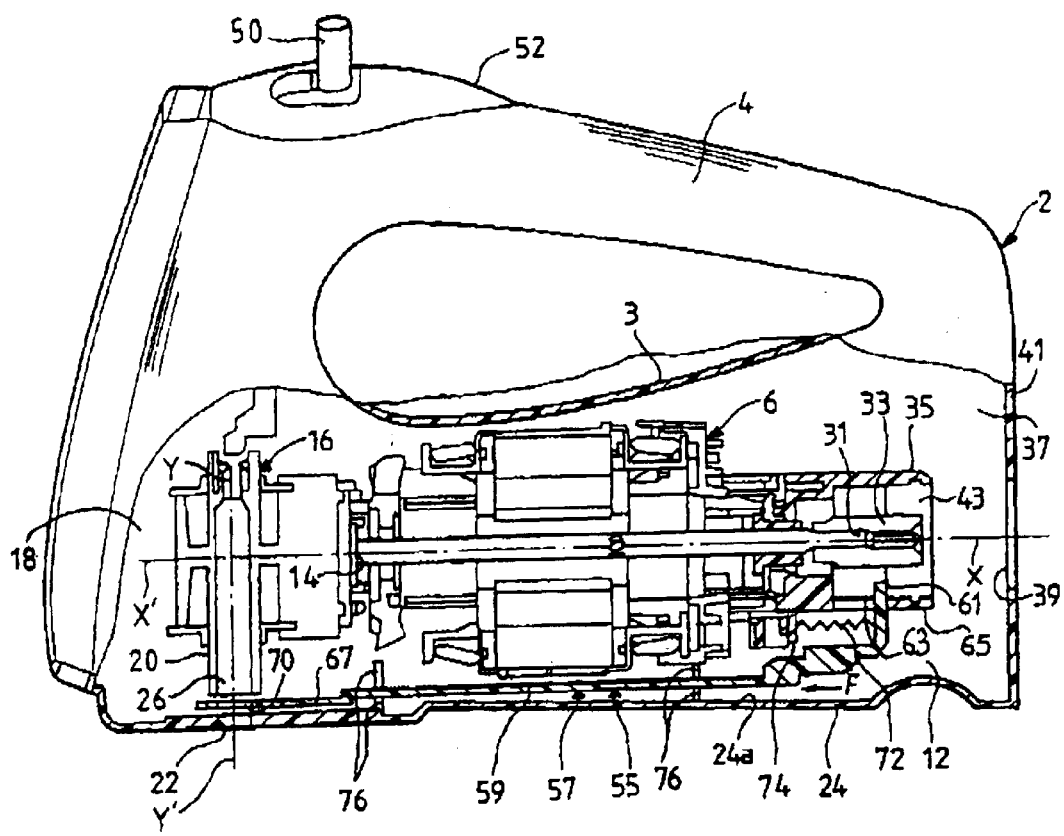
FIG_2
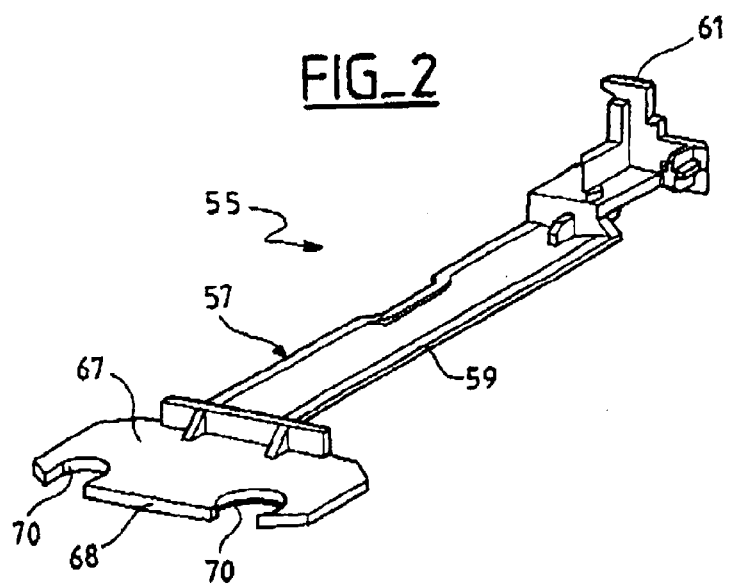

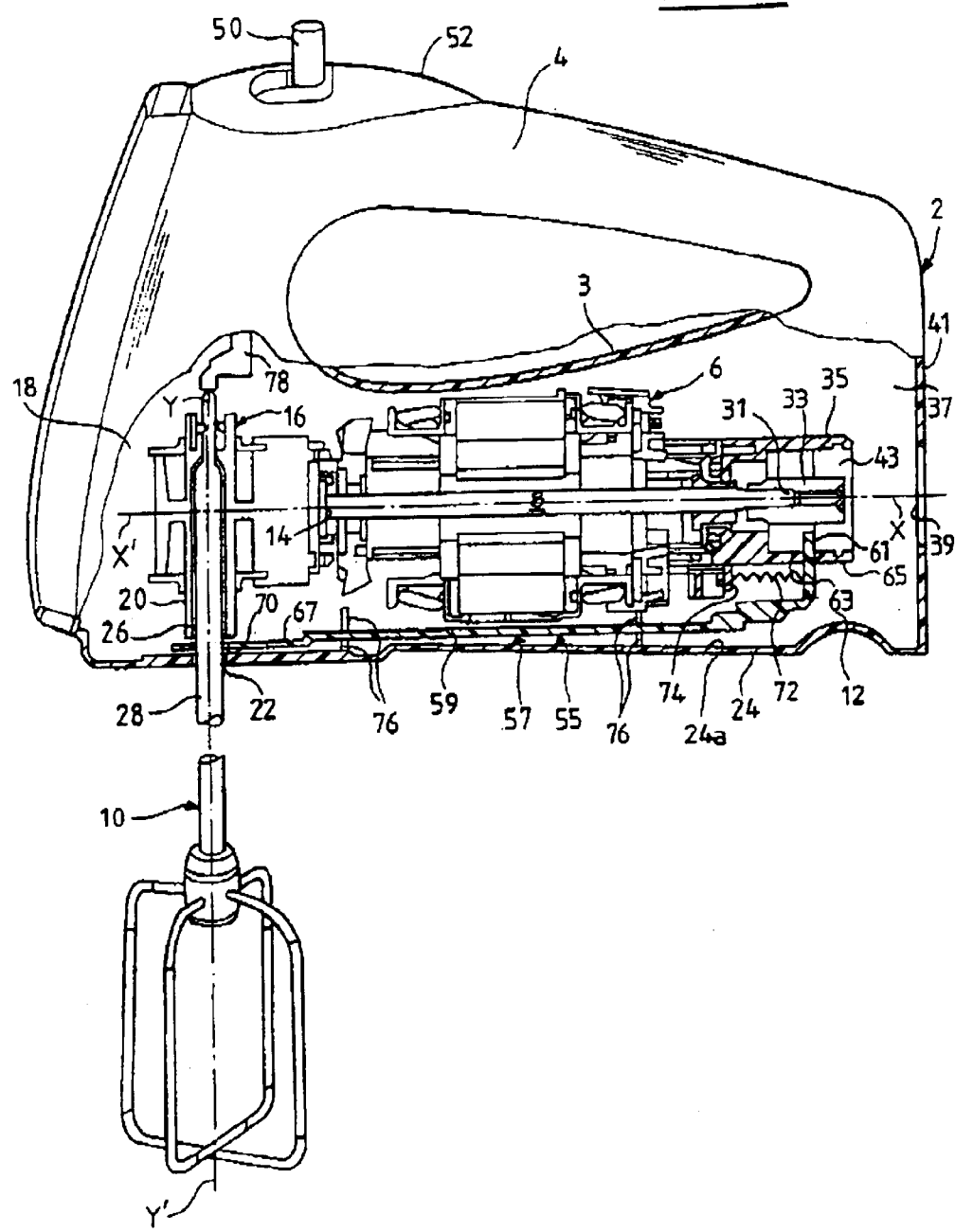

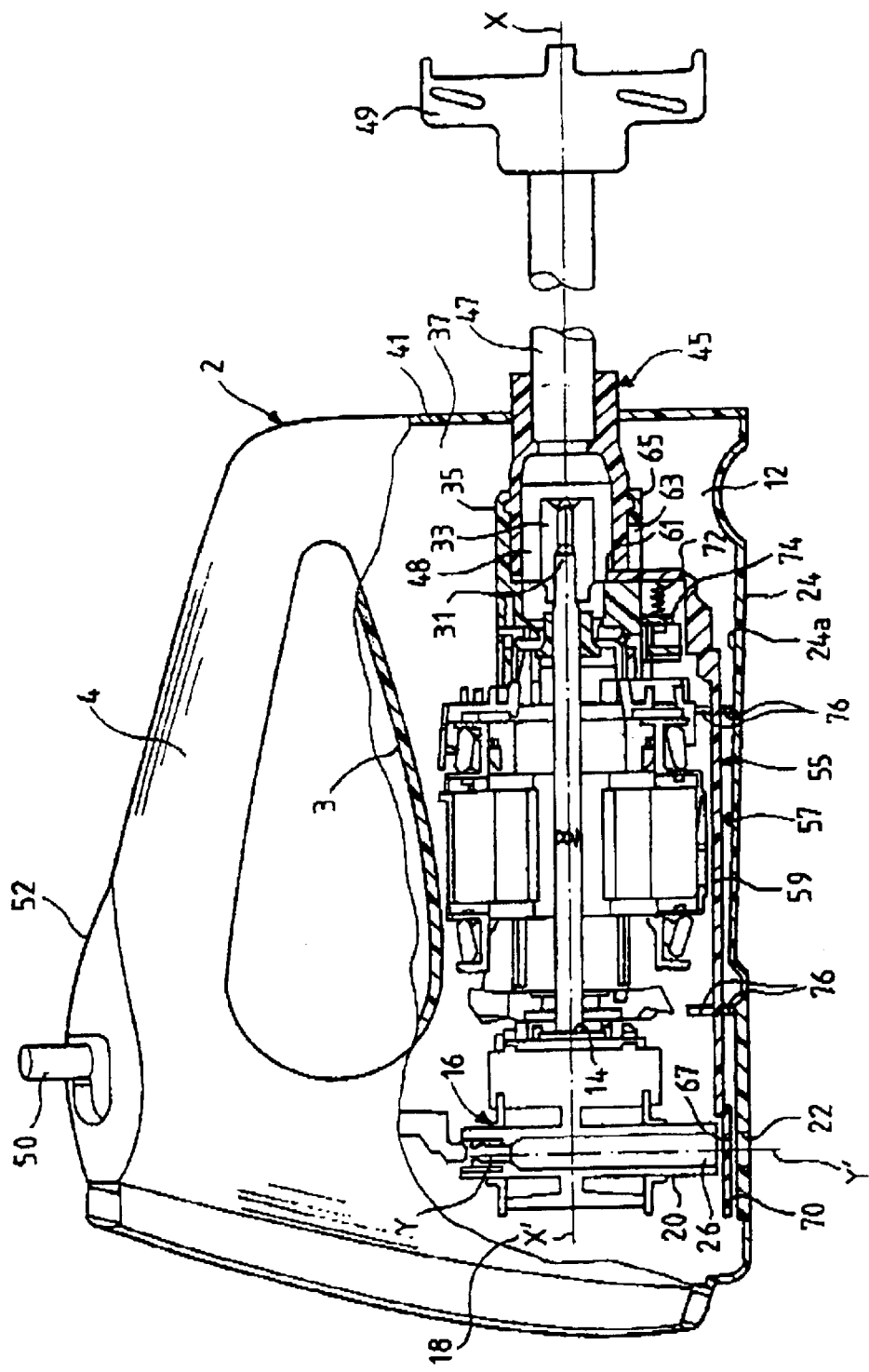
FIG_4

ELECTRIC HAND OPERATED ROTARY BEATER/MIXER COMPRISING A SAFETY DEVICE

BACKGROUND OF THE INVENTION

The present invention relates to a handheld electric beater-mixer, particularly a kitchen beater-mixer, adapted to drive at least one so-called beating accessory such as for example a whisk or a so-called mixing accessory turning at high speed, such as for example a mixer foot, and comprising a body containing an electric drive motor, two rotatable coupling devices which are connected to the motor shaft and which are adapted to receive, via respectively two engagement passages opening from the body, the beating accessory and respectively the mixing accessory, and a safety device adapted to prevent the simultaneous emplacement of two accessories, respectively for beating and for mixing.

There is meant by beating accessory a working tool of the whisk or blender type, and by mixing accessory an accessory with a working tool turning at high speed of the rotatable helical mixer foot type, or else of the mixer bowl type with a rotating knife.

With such a kitchen appliance, it is known that the presence of a safety device preventing the concomitant emplacement of the two accessories, respectively for beating and mixing, is particularly useful to protect the user from any risk of wounding which would be due to the two working tools in movement simultaneously if the apparatus were started with the two accessories in place.

In a known kitchen device of this type, the safety device which prevents the simultaneous emplacement of the two accessories, respectively for beating and for mixing, comprises a strap slidably horizontally mounted in the body of the apparatus, of which one end is shaped as a hooked tongue arranged in the engagement passage for the mixing accessory, and whose other end is shaped as a fork with several teeth, which fork is associated with an ejection member displaceable vertically between a low position and a high position under the action of the beating accessory. The fork of the strip is adapted to free the movement of the ejector member so as to permit the emplacement of the beating accessory, the hooking tongue of the strip closing the engagement passage for the mixing accessory; following disengagement of the hooking tongue of the strip under the action of the mixing accessory during its emplacement, the fork of the strip is adapted to block, by one of its teeth, the ejection member in the lower position, thereby preventing the emplacement of the beating accessory. Such a safety device is however complicated and is relatively complicated to use by being subject to the good operation of the ejection member mounted in the apparatus.

SUMMARY OF THE INVENTION

The invention has particularly for its object to overcome these drawbacks and to provide a handheld electric beater-mixer, of the type described above, in which the safety device will be simple, economical, reliable and perfectly adapted to mass production.

According to the invention, the safety device comprises a mechanical member movable so as to block selectively one or the other of the two engagement passages for the beating accessory and for the mixing accessory.

Thus, thanks to this selective blocking member acting directly on the two engagement passages, respectively for the beating accessory and for the mixing accessory, it will be understood that the use of the piece is thereafter rendered independent of any movable member belonging to the apparatus, which permits simplifying the safety device by rendering it particularly reliable.

BRIEF DESCRIPTION OF THE DRAWINGS

The characteristics and advantages of the invention will become further apparent from the description which follows, given by way of non-limiting example, with reference to the accompanying drawings, in which:

FIG. 1 is a fragmentary vertical cross-sectional view of a beater-mixer according to the invention, in the stopped position and in the absence of an accessory;

FIG. 2 is a perspective view, on an enlarged scale, of a safety device for the beater-mixer of FIG. 1;

FIG. 3 is a view identical to FIG. 1, with the mounting of a beating accessory; and FIG. 4 is a view identical to FIG. 1, with the mounting of a mixing accessory.

DESCRIPTION OF THE PREFERRED EMBODIMENTS

The handheld beater-mixer shown in FIG. 1 comprises a body 2 of generally substantially prismatic shape having a recess portion 3 which delimits a handle 4, and containing an electric drive motor 6 provided with a shaft 8 having an axis XX' and disposed, in normal use with at least one so-called beating accessory such as for example a whisk 10 as shown in FIG. 3, in the lower portion 12 of the body 2 extending horizontally.

In the embodiment shown in FIG. 1, the shaft 8 of the drive motor 6 carries at its front end 14 an endless screw (not shown) which coacts with two helicoidal pinions each turning about an axis YY' perpendicular to the axis XX', and which form with the latter a reducer 16. These two helicoidal pinions are located in the front portion 18 of the body 2 and are connected respectively to two rotatable coupling devices 20 of axis YY', of which only one is visible in FIG. 1, which are respectively open facing two openings 22 provided in the lower wall 24 of the body so as to define two passages 26 opening from the body and adapted for the engagement of two whisks 10 of which only one is shown in FIG. 3. Each whisk 10 comprises a cylindrical shaft 28 (FIG. 3), with an axis YY', whose upper end is adapted to be fixed in the corresponding coupling device 20. The two whisks 10 can be fixed in coupling devices 20 either side by side or one behind the other.

In this example, in FIG. 1, the shaft 8 of the drive motor 6 carries at its rear end 31 another rotatable coupling device 33 forming a drive which is disposed in a cylindrical socket 35 extending horizontally in the rear portion 37 of the body 2. In this embodiment, the socket 35 is open facing an opening 39 provided in the rear wall 41 of the body 2 so as to define a passage 43 opening from the body and adapted for the engagement of a mixing accessory turning at high speed such as for example a mixer foot 45 as shown in FIG. 4. This mixer foot 45, FIG. 4, is adapted to be fixed for example by screwing into the socket 35 and encloses a shaft 47 whose so-called rear end 48, opposite the blades 49 housing a helix (not shown), is adapted to couple with the drive 33.

In FIG. 1, 3 and 4, there is shown at 50 a finger piece mounted in the upper wall 52 of the body 2 and adapted, in a manner known per se, to actuate a switch (not shown) which places the motor in operation and controls its speed of rotation.

The beater-mixer moreover comprises a safety device, designated generally at 55 in FIGS. 1 to 4, adapted to prevent the simultaneous emplacement of the whisks 10 and of the mixer foot 45, and which, according to the invention, comprises a movable mechanical member 57 adapted to block selectively one or the other of the passages 26 and 43 for engagement of the whisks 10 and, respectively, of the mixer foot 45.

In a preferred embodiment shown in FIGS. 1, 3 and 4, this mechanical so-called safety member 57 is horizontally slidably mounted within the body 2, adjacent the internal surface 24*a* of the lower wall 24 of the body, and comprises a horizontal strip 59 whose rear portion carries a finger or lug 61, better shown in FIG. 2, projecting into the interior of the socket 35 through a clearance opening 63 provided in the sidewall 65 of the socket 35. As shown in FIG. 2, in this example, the forward portion of the strap 59 is shaped like a horizontal plate 67 forming a cover whose front edge 68 is hollowed out with two identical notches 70 associated respectively with the two passages 26 for engagement of the whisks and each having a profile adapted to that of the shaft 28 (FIG. 3) of the whisk 10, as well as a diameter slightly greater than the diameter of the shaft 28 of the whisk.

The safety member 57, FIGS. 1, 3 and 4, is urged by a return spring 72, in this instance a compression spring, which is interposed between the lower portion of the finger 61 of the strip 59 and a vertical wing 74 provided on the external surface of the sidewall 65 of the socket 35, adjacent the bottom of the latter.

There is shown at 76 in FIGS. 1, 3 and 4, ribs formed in the body 2 and bracing with slight play the strip 59 of the safety member 57; these ribs 76 ensure guidance of the strips 57 during its sliding.

In the stopped position of the beater-mixer, in the absence of any accessory, as shown in FIG. 1, the safety member 57 occupies a rest position in which the two notches 70 of its cover 67 are aligned with the two openings 22, thereby freeing the two passages 26 for engagement of the whisks, whilst its projecting finger 61 coacts in bearing with the sidewall 55 of the socket 35, under the action of the compression spring 72.

With reference to FIG. 3, the safety member 57 occupies a so-called beeping position which corresponds to it rest position in FIG. 1 in which the two passages 26 are freed and hence permit the emplacement of the whisks 10, whilst the passage 43 is obstructed by the finger 61 projecting into the socket 35. The shafts 28 of the whisks 10 thus pass each through its respective opening 22, with slight peripheral play, then through the corresponding notch 70 of the cover 67 of the safety member 57, also with slight peripheral play, to become fixed in the corresponding coupling device 20.

In this beating position shown in FIG. 3, if the user introduces the mixer foot 45 through the opening 39, the mixer foot 45 can not substantially move the finger 61, except for the peripheral play existing between the shaft 28 of each whisk 10 and the corresponding notch 70 of the cover 67 of the safety member 57, such that the mixer foot 45 cannot be completely emplaced in the socket 35; it will be understood that a slight displacement of the finger 61 results in the abutment of the bottom of each notch 70 of the cover 67 against the corresponding shaft 28 of the whisk 10, preventing the complete emplacement of the mixer foot 45 and hence its coupling with the drive 33.

From the beating position of FIG. 3, the whisks 10 can be freed, in a manner known per se, by an ejection member, shown at 78 in FIG. 3, which is adapted to be actuated by the finger piece 50.

With reference to FIG. 4, the safety member 57 occupies a so-called mixing position to which it is brought by sliding in the direction of the arrow F in FIG. 1, under the action of the emplacement by screwing of the mixer foot 45, thus giving rise to the longitudinal movement of the finger 61 of the member 57 within the socket 35, against the compression spring 72. At the end of the screwing path of the mixer foot 45, as shown in FIG. 4, the shaft 47 of the latter is coupled with the drive 33, and the cover 67 of the safety member 57 closes the two openings 22, thereafter preventing the emplacement of the whisks 10.

From the mixing position of FIG. 4, the mixer foot 45 can be simply withdrawn by unscrewing, the safety member 57 then returning, under the action of compression spring 72, to its rest position as shown in FIG. 1.

As will be seen from the above description, the safety member 57 constitutes a simple mechanical member serving as a selective block which acts directly on the passages 26 and 43 for engagement of the whisks 10 and respectively the mixer foot 45, and this quite independently of any movable member mounted in the apparatus.

What is claimed is:

1. A handheld electric beater-mixer adapted to drive at least one beating accessory (10) or a mixing accessory (45) turning at high speed, comprising:

a body (2) containing an electric drive motor (6), two rotatable coupling devices (20, 33) which are connected to a shaft (8) of the motor (6) and which are adapted to receive, via respectively two engagement passages (26, 43) opening from the body (2), the beating accessory (10) and respectively the mixing accessory (45), and a safety device (55) adapted to prevent the simultaneous emplacement of the beating and mixing accessories, said safety device (55) comprising a movable mechanical member (57) adapted to block the passage (43) for engagement of the mixing accessory (45) and to block the passage (26) for engagement of the beating accessory in a selective manner with respect to the passage (43) for engagement of the mixing accessory (45).

2. The beater-mixer according to claim 1, wherein the mechanical member (57) comprises a portion forming a cover (67) associated with the passage (26) for engagement of the beating accessory (10), and a portion forming a finger (61) associated with the passage (43) for engagement of the mixing accessory (45), this member (57) being movable between a beating position in which its portion forming the cover (67) uncovers the outlet (22) of the passage (26) for engagement of the beating accessory (10) so as to permit the emplacement of this beating accessory, whilst its portion forming the finger (61) projects into the passage (43) for engagement of the mixing accessory (45) so as to prevent the emplacement of the mixing accessory, and a mixing position in which its portion forming the finger (61) is disengaged so as to permit the emplacement of the mixing accessory, whilst its portion forming the cover (67) closes the outlet (22) of the passage (26) for engagement of the beating accessory (10) so as to prevent the emplacement of the beating accessory.

3. The beater-mixer according to claim 2, wherein the mechanical member (57) is urged by resilient return means (72) which tend to return it to the beating position.

4. A handheld electric beater-mixer adapted to drive at least one beating accessory (10) or a mixing accessory (45) turning at high speed, comprising:

a body (2) containing an electric drive motor (6), two rotatable coupling devices (20, 33) which are connected to a shaft (8) of the motor (6) and which are adapted to receive, via respectively two engagement passages (26, 43) opening from the body (2), the beating accessory (10) and respectively the mixing accessory (45), and a safety device (55) adapted to prevent the simultaneous emplacement of the beating and mixing accessories, said safety device (55) comprising a movable mechanical member (57) adapted to block selectively one or the other of the two passages (26, 43) for engagement of the beating accessory (10) and the mixing accessory (45), wherein the mechanical member (57) comprises a portion forming a cover (67) associated with the passage (26) for engagement of the beating accessory (10), and a portion forming a finger (61) associated with the passage (43) for engagement of the mixing accessory (45), this member (57) being movable between a beating position in which its portion forming the cover (67) uncovers the outlet (22) of the passage (26) for engagement of the beating accessory (10) so as to permit the emplacement of this beating accessory, whilst its portion forming the finger (61) projects into the passage (43) for engagement of the mixing accessory (45) so as to prevent the emplacement of the mixing accessory, and a mixing position in which its portion forming the finger (61) is disengaged so as to permit the emplacement of the mixing accessory, whilst its portion forming the cover (67) closes the outlet (22) of the passage (26) for engagement of the beating accessory (10) so as to prevent the emplacement of the beating accessory, wherein the passage (26) for engagement of the beating accessory (10) opens through the lower wall (24) of the body (2), whilst the passage (43) for engagement of the mixing accessory (45) opens through the rear wall (41) of the body (2), the coupling device (33) for the mixing accessory (45) is disposed in a cylindrical socket (35) extending horizontally and defining the engagement passage for the mixing accessory, and the beating accessory (10) comprises a shaft (28) of which one end is adapted to couple with the associated coupling device (20), and wherein the mechanical member (57) is mounted horizontally slidably in the body (2), adjacent an internal surface (24a) of the lower wall (24) of the body (2), wherein the portion forming a finger (61) of the member (57) is engaged within the socket (35) through a clearance opening (63) provided in the sidewall (65) of said socket (35) and disengages as a result of the emplacement of the mixing accessory (45), and wherein the portion forming a cover (67) of the member (57) comprises at least one notch (70) which is located facing the outlet (22) of the passage (26) for engagement of the beating accessory (10) when the member (57) is in the beating position, and is adapted, in this beating position, to let pass with slight peripheral play the shaft (28) of the beating accessory (10).

5. The beater-mixer according to claim 4, wherein guide means (76) are disposed in the body (2) to guide the mechanical member (57) during its sliding.

6. The beater-mixer according to claim 5, wherein the mechanical member (57) is urged by resilient return means (72) which tend to return it to the beating position.

7. The beater-mixer according to claim 4, wherein the mechanical member (57) is urged by resilient return means (72) which tend to return it to the beating position.

8. A handheld electric beater-mixer for driving a beating accessory or a mixing accessory, the beater-mixer comprising:

a body containing an electric drive motor, coupling devices connected to a shaft of said motor and that receive, via a first opening in said body, the beating accessory, and via a second opening in said body, the mixing accessory; and a member movable between a first position and a second position, said member having a first portion that closes the first opening when said member is in the first position, and a second portion that blocks access to said coupling devices through the second opening when said member is in the second position for preventing simultaneous emplacement of the beating and mixing accessories.

9. The beater-mixer according to claim 8, wherein said first portion comprises a flat plate with a recess, said flat plate closing said first opening when said member is in the first position and said recess being in registration with said first opening when said member is in the second position.

* * * * *